United States Patent

Verhoeven et al.

[11] 4,028,052
[45] June 7, 1977

[54] TUNNEL FURNACE FOR THE HEAT TREATMENT OF ARTICLES

[75] Inventors: Gerardus H. Th. M. Verhoeven, Zevenaar; Heinrich P. Stensen, Nijmegen, both of Netherlands

[73] Assignee: Smit Ovens Nijmegen B.V., Nijmegen, Netherlands

[22] Filed: Apr. 23, 1975

[21] Appl. No.: 570,966

[30] Foreign Application Priority Data
Nov. 4, 1974 Germany ............... 7436722[U]

[52] U.S. Cl. ............... 432/145; 432/189; 432/194
[51] Int. Cl.² ............... F27B 9/00
[58] Field of Search ............... 432/143–146, 432/132–136, 130, 148, 152, 189, 194

[56] References Cited

UNITED STATES PATENTS

| | | | |
|---|---|---|---|
| 1,749,988 | 3/1930 | Sheffield | 432/189 |
| 2,039,429 | 5/1936 | Lydon | 432/194 |
| 2,181,928 | 12/1939 | Vaughan | 432/145 |
| 2,458,040 | 1/1949 | Weller | 432/145 |
| 3,100,632 | 8/1963 | Mohring | 432/145 |
| 3,668,817 | 6/1972 | Bell | 34/225 |

Primary Examiner—John J. Camby
Assistant Examiner—Henry C. Yuen
Attorney, Agent, or Firm—Cushman, Darby & Cushman

[57] ABSTRACT

A tunnel furnace composed of individual sections for the heat treatment of articles which are transported through said tunnel on an air permeable belt whereby each section is separated by shields into a main heating space and a pair of flanking outer spaces in communication with the heating space at the top thereof and below said belt, and circulation fans are disposed within the furnace for circulating air in a continuous path upwards through the conveyor belt and then downwards through the outer spaces. A heater is disposed in each outer space comprising a burner and a pipe elbow section for conducting the flame and the combustion gases, the elbow section having an S-shaped configuration so that the combustion gases flow upward during a portion of their travel within the elbow section terminating in a mouth exposed to the circulating air flow.

4 Claims, 3 Drawing Figures

U.S. Patent   June 7, 1977   4,028,052
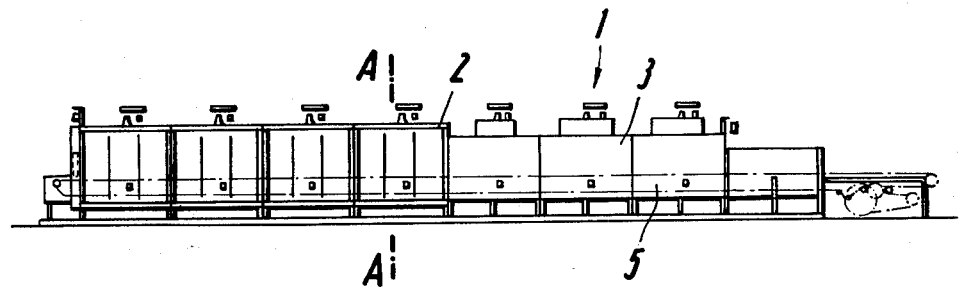
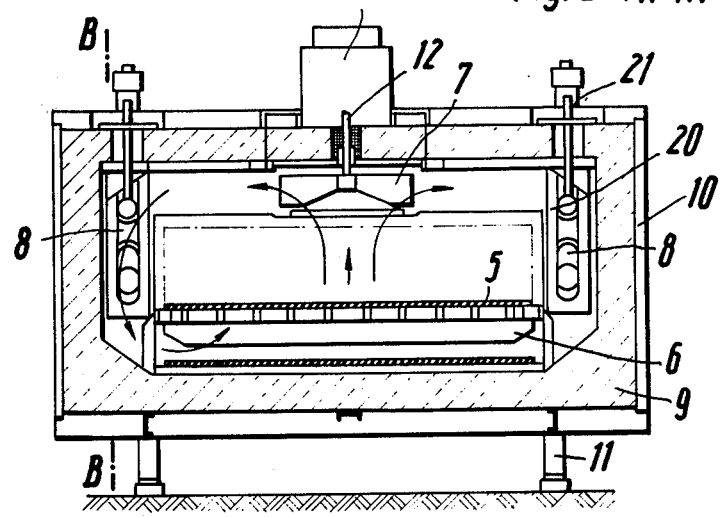
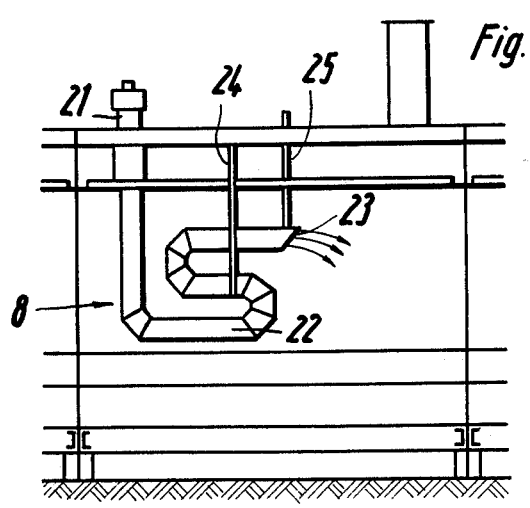

TUNNEL FURNACE FOR THE HEAT TREATMENT OF ARTICLES

The present invention relates to a tunnel furnace or kiln composed of individual sections, for the heat treatment of articles, e.g. glassware, which articles are transported on a rotating, endless, air permeable conveyor belt, comprising circulation fans for circulating in furnace sections the air heated by controllable heater means, wherein oil or gas fed burners are positioned as heater means laterally behind shields within the circulating flow.

A tunnel furnace of the above-outlined type is known from applicant's laid-open German patent application No. 2,344,138 and corresponding U.S.-application Ser. No. 398,020 of Sept. 17, 1973, now U.S. Pat. No. 3,884,667. In the known tunnel furnace, a heater element is employed which comprises a vertically positioned burner which blows the hot combustion gases freely into the circulation path after a short distance along which the combustion gases are confined by y flame tube. It has been found that, this type of heating means, although quite useful for most purposes, nevertheless leaves much to be desired, and that particularly in the following respects:

Due to the relatively short tube path, the heat is not homogenized in optimum manner within the exhausted combustion gases. When the hot combustion gases impinge on certain surfaces interiorly of the tunnel furnace, so — called hot spots may result which can cause premature wear — out of the furnace;

the heat transition and transfer takes place exclusively in the exhausted combustion gases, which fact likewise may results in unhomogeneous heating of the combustion air.

In order to improve the conventional tunnel furnace, the invention has as its object to avoid the abovementioned disadvantages and, particularly, to provide the following:

Improved heat distribution within the circulating stream and at the portions or sections of the furnace; the heat loss should be maintained as low as possible; the combustion should be as complete as possible when the hot combustion gases exit from the furnace.

With the tunnel furnace according to the invention, these objects are solved in that said heater means each comprise a burner and a subsequent pipe elbow section for conducting the flame and the combustion gases and having a mouth exposed to the circulating flow.

By means of the succeeding pipe elbow section, it is obtained that an improved heat distribution is achieved over a greater length of pipe, and that the heating takes place both directly at the pipe and also at the exiting combustion gases, such that a higher heat transition or transfer is provided. In these respects, it has to be noted also that short intense flames produce a high energy density within the flame cone. The thereby produced high temperatures necessitate the installation of specific, high refractory material which are of relatively poor insulating capacity. By corresponding conduction of the combustion gases which may readily be controlled by the position of the mouth, overstraining by hot spots is minimized. Also, the hot gases can be better controlled and regulated.

Preferably, the exhaust direction of the mouth of the pipe elbow section is positioned so as to lie approximately in parallel with the direction of conveyance of the belt; in this case, the math is arranged such that the exiting gases are sufficiently spaced from the portions of the furnace. The lastmentioned measure allows to avoid the formation of hot spots and to provide for homogeneous distribution of the gases with the circulated air.

Preferably, the pipe elbow section is of S-shaped configuration, whereby the combustion gas stream flows through this structure from below to above. In this way, it is obtained that a relatively great transition peripheral surface of the pipe elbow section is provided within minimum space. Reference may be made to the fact that other configurations of the pipe elbow sections may perhaps provide similar results.

In order to blow in the gases in a downwardly inclined direction, if possible, and thereby to prevent them from contacting sensitive portions of the furnace, it is suggested that the mouth of the pipe elbow section is obliquely out from the lower front side to the upper rear side.

In order that the composition of the exhausted combustion gases may be monitored more effectively, it is proposed to provide a sensor in the region of the circulating flow mixed with the combustion gases.

Finally, it is proposed to arrange the burner in a substantially vertical position. This arrangement provides the advantage that, on principle, it can be started with the conventional tunnel furnaces or kilns, or that existing tunnel furnaces can be concerted to comply with the present invention.

Further properties and advantages of the present invention are explained in greater detail in the following specification by referring to the enclosed drawings, wherein:

FIG. 1 shows a tunnel furnace comprising a plurality of heated sections;

FIG. 2 is a sectional view along lines A — A on enlarged scale over FIG. 1 and

FIG. 3 is a sectional view along lines B — B of FIG. 2.

As shown in FIG. 1, the tunnel furnace or kiln, shown generally at 1 is composed of individual sections 2, 3 through which a conveyor belt 5 travels which belt is rerouted and driven at the front and at the rear of the furnace. The conveyor belt 5 is made of a heat resistant and resilient material, e.g. from steel wire. The belt is formed with meshes so as to be permeable to air from its lower side. Interiorly of the furnace, the belt is rested on a support 6 which is likewise provided with perforations for the passage of air therethrough. The articles to be heated, e.g. glassware, are placed onto the belt at the front end of the furnace and removed from the belt after their travel through the furnace.

Examples of the heat distribution and function of a furnace 1 can be gathered from the laid-open German patent application No. 2,344,138 or corresponding perding U.S. application Ser. No. 398,020, now U.S. Pat. No. 3,884,667.

As shown in FIG. 2, an individual section 2 is provided with a peripheral insulation 9 disposed within a frame 10. The frame rests on feet 11. Beneath the ceiling, a shaft 12 passed through the insulation 9 is shown, which shaft is driven by an electric motor 13 and which rotates a fan 7.

At the sides of the space through which the conveyor belt travels, heater elements 8 are positioned behind shields 20. The fan 7 urges the air laterally behind the shields and, thus, into the vicinity of the heater elements 8 which are contacted by the air stream descending along the outer walls, whereby the air stream, then, enters the space between lower and upper sides of the conveyor belt 5 to be recycled thereafter.

The particular configuration of the heater elements is evident from FIG. 3. The heater elements include a burner 21 extending through the housing of the furnace, which burner is operated with oil or gas. In the embodiment shown, the burner extends vertically into the combustion chamber. However, in other embodiments it is also possible to position the burner with an inclination. Following the straight burner section is a pipe elbow section 22 having an S-shaped configuration. The combustion gas stream flows through this structure from below to above up to a mouth 23 from which the hot combustion gases are exhausted. The mouth is bevelled from the lower front side to the upper rear side such that the preferred direction of the combustion gases extends obliquely downwards.

In addition to the S-shaped configuration, however, other pipe elbow configurations are also possible wherein the mouth is positioned at the rear of the burner at the end of a pipe elbow section. The pipe elbow section is suspended from a supporting brace 24. In the region of the mouth, a sensor or measuring device 25 is provided by means of which the composition of the gas flow may be monitored continuously.

Apparently, the gas flow contacts a substantially increased pipe surface area at which good heat transition or transfer can take place. The mouth of the pipe may be arranged such that the exhausted gases are sufficiently spaced from portions of the furnace being susceptible to wear such that hot spots are not formed which would reduce the operational life of the furnace.

Combustion and heat distribution are substantially more homogeneous because of the long pipe section such that the fuel is better utilized.

What we claim is:

1. A tunnel furnace composed of individual sections for the heat treatment of articles which are transported through said tunnel comprising:
    a rotating, endless, air permeable conveyor belt for carrying said article through a main heating space;
    means for separating each said section into said main heating space and outer spaces on either side of said main space in communication with said heating space at the top thereof and below said belt;
    circulation fans within said furnace for circulating air in a continuous path upwards through said conveyor belt and then downwards through said outer spaces;
    a heater disposed in each said outer space comprising a vertically extending burner pipe and a pipe section extending therefrom in a vertical plane in said outer space for conducting the flame and combustion gases, said section having an S-shaped configuration with vertically spaced horizontal portions connected by U-shaped portions so that the combustion gases flow upward during a portion of their travel within said section and for heating said circulating air which moves past said burner pipe and said section, said section terminating in a mouth exposed to the circulating air flow.

2. A tunnel furnace according to claim 1, the direction of exhaust of said mouth extends approximately in parallel with the direction of conveyance of said belt, said mouth being disposed such that the exhausting gases are sufficiently spaced from portions of the furnace.

3. A tunnel furnace according to claim 1 wherein the mouth of said pipe elbow section is cut at an angle from the lower front side to the upper rear side.

4. A tunnel furnace according to claim 1 further including a sensor provided in the region of the circulating flow mixed with said combustion gases.

* * * * *